(No Model.)
G. R. CULLINGWORTH.
METHOD OF DRYING COMPRESSED AIR.
No. 355,002. Patented Dec. 28, 1886.
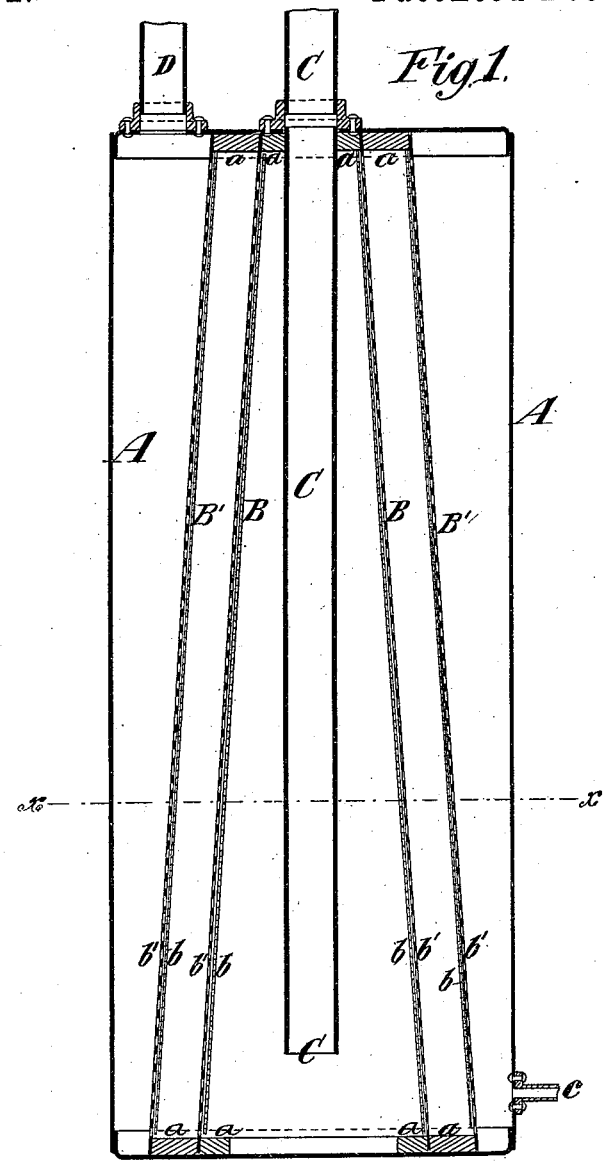
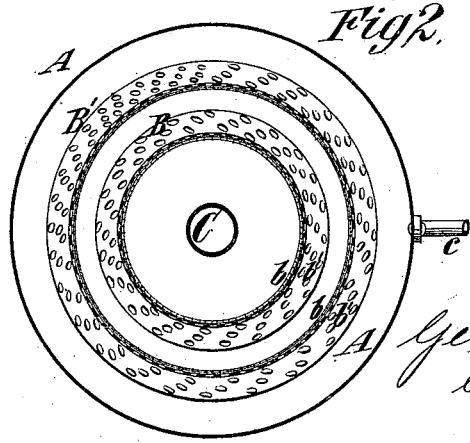
Witnesses:
C. E. Sundgren
Emil Herter
Inventor:
Geo. R. Cullingworth
by his Atty
Brown & Hall

UNITED STATES PATENT OFFICE.

GEORGE R. CULLINGWORTH, OF NEW YORK, N. Y.

METHOD OF DRYING COMPRESSED AIR.

SPECIFICATION forming part of Letters Patent No. 355,002, dated December 28, 1886.

Application filed January 15, 1886. Serial No. 188,703. (No specimens.)

*To all whom it may concern:*

Be it known that I, GEORGE R. CULLINGWORTH, of the city and county of New York, and State of New York, have invented a new and useful Improvement in the Method of Drying Compressed Air, of which the following is a specification.

Compressed air as delivered from ordinary air-compressors contains a considerable amount of moisture, and also is in a heated condition. When such compressed air is expanded in use a high degree of cold is developed, and if it contains much moisture ice is often formed.

The object of my invention is to dry the compressed air while under pressure, or, in other words, so far as possible, to relieve it of moisture, or cause it to deposit the moisture which it holds in suspension.

The invention consists in an improvement in the method of drying compressed air, consisting in straining or sieving the air while under pressure through fine wire-gauze or other perforated or reticulated material having fine openings.

In the accompanying drawings, Figure 1 is a sectional elevation of an apparatus which may be employed for carrying out my invention; and Fig. 2 is a horizontal section thereof upon the plane of the dotted line $x$ $x$, Fig. 1.

Similar letters of reference designate corresponding parts in both figures.

It is of course obvious that other forms of apparatus might be employed for carrying out my improved method; but the form of apparatus shown I now consider well adapted for the purpose.

A designates a strong metallic vessel or reservoir, (here shown as consisting of an upright cylinder,) and it should be of sufficient strength to resist the internal pressure due to the compressed air. Within the tank or reservoir I have represented two circular screens or sieves, B B', arranged one within the other, and extending from top to bottom of the tank or reservoir. I have also shown an inlet-pipe, C, for compressed air, which extends downward centrally within and near to the bottom of the reservoir A, and an outlet-pipe, D, which extends from the upper part of the reservoir A, and through which the compressed air, after being dried or relieved of moisture, is delivered.

The compressed air may be supplied by any suitable air-compressor through the pipe C, and after being dried or relieved of moisture by its passage through the apparatus it may be passed through the pipe D to a storage-tank or reservoir from which the rock-drills or other machines are supplied, or it may pass through the pipe D directly to such machines, the reservoir A being then of sufficient size to serve as a storage-tank.

As here represented, the upper and lower ends of the sieves or screens B B' are held in proper position by rings or disks $a$, of wood or other material, upon which they are fitted, and they are here shown as tapering upward, which facilitates placing them one upon another. Inasmuch as the air enters at the bottom, it will gradually escape through the sieves or screens B as it ascends upward, and hence the upper portions of the sieves or screens need not offer so large a surface as the lower portions thereof.

The sieves or screens may be of any suitable perforated or reticulated metal or other material which will afford numerous fine openings for the passage of the compressed air. I now consider it desirable to form each screen or sieve of an inner ply, $b$, of fine wire-gauze, and an outer ply, $b'$, of perforated sheet metal, which serves to sustain the wire-gauze and hold it in place. I have here represented two sieves or screens, B B', for the air to pass through, but it is obvious that one sieve or screen, or any greater number than two, may be employed. In passing through the sieves or screens the compressed air is divided up into fine jets or streams, and it is found that the moisture which it contains will be largely deposited on the sieves or screens and will flow downward to the bottom of the tank or reservoir, from whence in may be discharged through a pipe, C.

The method described for relieving compressed air of its moisture is very simple and effective, and an apparatus suitably constructed for the purpose will be very durable, as the method is not destructive of the apparatus.

I am aware that it is not new to dry steam and free it from the water carried over in suspension from a boiler by passing the steam through wire-gauze, and hence I do not seek to cover, broadly, such a method of drying aeriform fluids generally, but limit my invention to the drying of compressed air. In compressed air the water is in a far more finely-diffused state than in the steam passing from the water in a boiler, and even though the steam could be freed of its water held in suspension by passing it through wire gauze it did not follow without experiment that compressed air could be dried in the same way, and it has, in fact, not been so dried before my experiments and invention, although for very many years steam has been freed from water by passing it through wire-gauze.

What I claim as my invention, and desire to secure by Letters Patent, is—

The improvement in the method of drying compressed air, consisting in straining or sieving the air while under pressure, substantially as herein described.

G. R. CULLINGWORTH.

Witnesses:
FREDK. HAYNES,
HENRY McBRIDE.